United States Patent
Nielsen

[15] 3,653,319
[45] Apr. 4, 1972

[54] METHOD FOR BRIQUETTING GRASS AND SIMILAR GREEN CROPS

[72] Inventor: Alfred T. Nielsen, Holte, Denmark

[73] Assignee: Unidry K/S Engineering and Development Group, Copenhagen, Denmark

[22] Filed: Feb. 9, 1970

[21] Appl. No.: 10,047

[30] Foreign Application Priority Data

Feb. 10, 1969 Denmark..............................719/69

[52] U.S. Cl..........................................100/38, 100/DIG. 5
[51] Int. Cl.................................................B30b 15/34
[58] Field of Search...................100/35, 37, 38, 92, 93, 179, 100/139, 138, DIG. 5, DIG. 9; 18/5; 99/8, 235 A

[56] References Cited

UNITED STATES PATENTS

| | | |
|---|---|---|
| 2,942,976 | 6/1960 | Kosch..............................100/DIG. 5 |
| 3,323,444 | 6/1967 | Mark et al. ..............................100/38 |
| 3,352,229 | 11/1967 | Morse.....................................100/38 |

Primary Examiner—Peter Feldman
Attorney—Sughrue, Rothwell, Mion, Zinn & Macpeak

[57] ABSTRACT

In the manufacture of fodder briquettes, especially for ruminants, the green crops are artificially dried to a moisture content of 15–22% and, while at a temperature of 45°–65° C. (110°–150° F.), are fed to a reciprocating briquette press for being compressed to a specific weight of 0.7–0.9 grams per cm.$^3$. The briquette rod produced is cooled while passing through a guide pipe somewhat larger in diameter than the rod which is displaced through the guide pipe against a resistance to counteract longitudinal expansion of the briquette rod.

1 Claims, 1 Drawing Figure

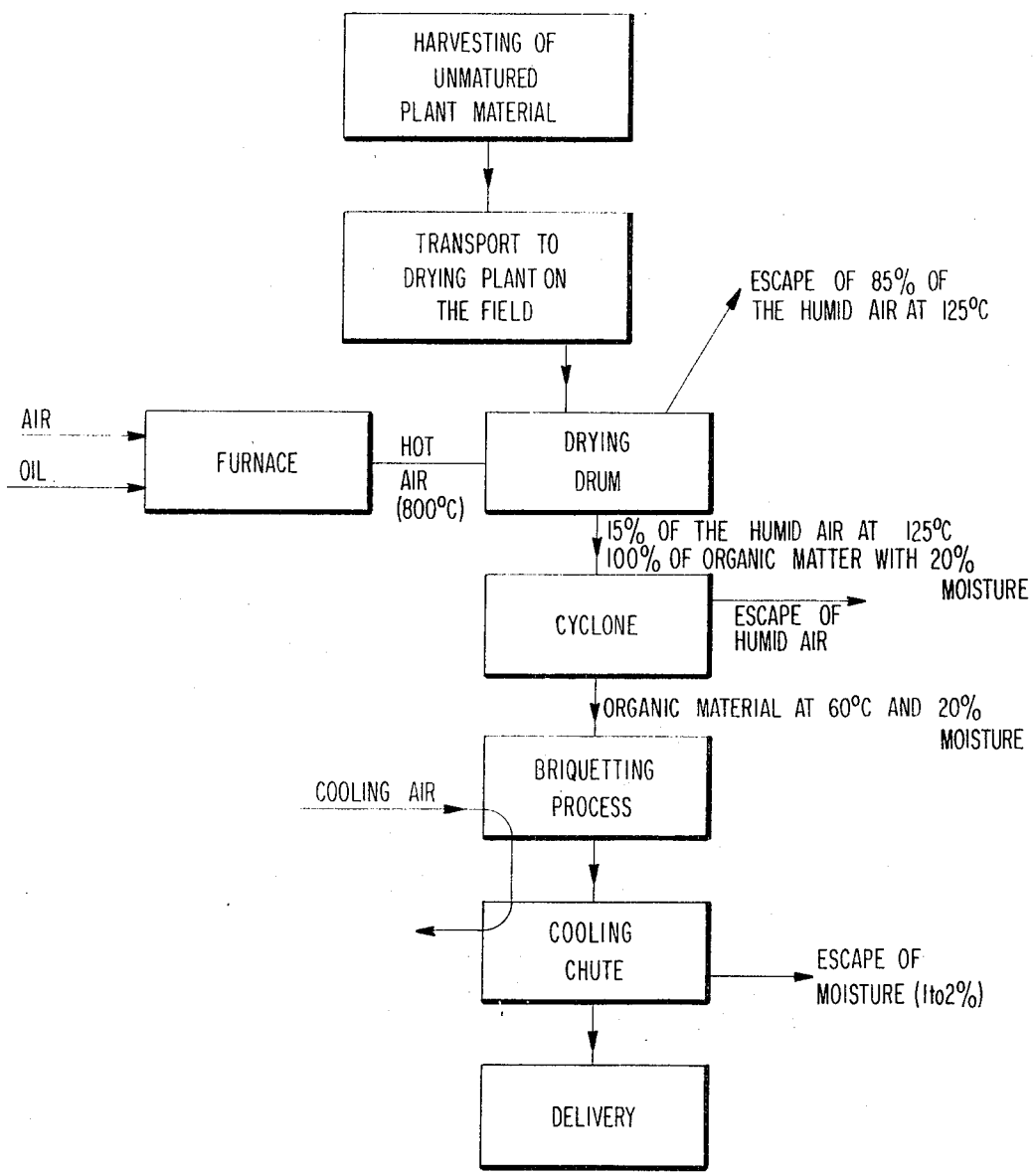

3,653,319

METHOD FOR BRIQUETTING GRASS AND SIMILAR GREEN CROPS

BACKGROUND OF THE INVENTION

Description of the Prior Art

For the preservation of grass or similar green crops for use as fodder, the drying of the raw material to a water content not exceeding 12–14% is usually required. This may be achieved by natural drying or airing in the field or by artificial drying, e.g. in a rotating drying drum, though which heated air is passed. In both cases, the drying may be followed up by a briquetting operation with a view to substantially reducing the space requirement of the fodder, as well as facilitating its transport both externally and internally.

In the drying and briquetting operations it is, in practice, impossible to avoid that the raw material loses a certain part of its original nutritive value, inter alia, as a consequence of a destruction of its protein content. It is generally admitted that this loss of analyzable nutritive value should not exceed 8%. It does, however, happen frequently that a substantially greater loss takes place as a consequence of the briquetting, that is to say in form of direct waste of material on account of the poor strength of the briquette, and also because the raw material is broken down mechanically in the briquetting operation so that the original straw structure is lost. This may result in up to 80% of a finished briquette consisting of pulverized material or dust which still possesses the prescribed analyzable or biological nutritive value, but which, however, cannot be utilized to its optimum by ruminants, as these, when consuming the crumbled or pulverized material, are incapable of producing those secretions such as saliva and gastric juice which are required for utilizing the biological nutritive values of the fodder.

With a view to briquetting process itself, it is important that the material be dried rather uniformly, as otherwise the finished briquettes will be of a widely varying moisture content. It has been attempted to meet this condition in various ways depending on how the drying is carried out. If the drying thus takes place by airing in the field with, for instance, the crop lying in swaths, it will be possible to undertake a cutting up and mixing of the dried material in conjunction with its collection, and the moisture content may possibly be regulated by spraying it direct with water. If, on the other hand, it is a question of artificial drying, it has been proposed to carry out a certain homogenization of the material, e.g. in a beating mill, in order to render the uniform drying possible, and in such a case it may become necessary to regulate the moisture condition during the briquetting operation up to the said 12–14% by re-moistening with water or steam. If the briquetting material has a lower moisture content, it is considered necessary to add a binding agent, e.g. molasses, in order to obtain the required mechanical strength of the briquettes.

These methods for ensuring a uniform drying of the briquetting material are useful, but they result in an increase in the percentage of dust in the finished briquettes, which, as explained in the foregoing, means a decrease in their nutritive value. Moreover, it is irrational to dry the material more than is strictly necessary and subsequently to carry out a re-moistening with a view to briquetting of the material.

SUMMARY OF THE INVENTION

It is the object of the invention to render a rational manufacture of briquettes possible in such a way that, on the one hand, a preservation of the straw structure of the raw material is ensured for the benefit of the nutritive value of the briquettes, and, on the other hand, a reasonable mechanical strength of the briquettes is obtained.

The drawing illustrates in flow-sheet style the overall process in accordance with the invention.

Accordingly, the invention relates to a method for briquetting of grass and similar green crops which, subsequent to artificial drying to a moisture content of 15–22%, are conducted to a briquette press having at least one reciprocating punch or piston which, while compressing the material, extrudes same through an associated die for forming a briquette rod having a diameter of approximately 50–75 mm. This method is, according to the invention, characterized in that the material is supplied to the briquette press at a temperature of 45°–65° C. and in that during the briquetting operation it is exposed to a piston or punch pressure of such a magnitude that the material is compressed to a specific weight of approximately 0.7–0.9 grams per cm.$^3$, and in that the briquette rod formed is, while being cooled, conducted through a guiding pipe, the diameter of which is 10–25% greater than the discharge aperture of the die and the length of which is such that the briquette rod, at the discharge end of the guiding pipe has lost the greatest part of its original plasticity, and in that the briquette rod, during its passage through the guiding pipe, is kept under pressure in the longitudinal direction in order to counteract its longitudinal expansion when the internal pressure is relieved.

The invention is based on the recognition that the low moisture content necessary for the durability or preservation of the briquettes does not necessarily have to be obtained prior to the briquetting itself, since the removal of excess moisture may take place after the formation of the briquettes, especially by utilizing the heat content of the newly formed briquettes for promoting the evaporation of the excess moisture. This is part of the reason why the material, in the method according to the invention, is supplied to the briquette press at a considerably higher temperature than has hitherto been used in the manufacture of fodder briquettes; it is, however, of greater importance that the increased temperature in conjunction with the increased moisture content has to a significant degree a favourable influence on the strength of the finished briquettes, partly because the material possesses a greater plasticity while being compressed and extruded, and partly because the content of the material in carbohydrates and other sticky components preserves or develops their binding action to a greater degree than when the material has a lower temperature and is dried to a lower moisture content.

During the briquetting process, the temperature is increased further, by way of example by 20°–30° C., on account of internal and external friction in the die, and in order to counteract damage by heat to the protein content, a cooling of the extruded briquette rod should, therefore, take place gradually as same comes out of the die. At this moment, the briquette rod is relatively plastic on account of the prevailing temperature, moisture and pressure conditions, so that it is not capable of standing the longitudinal holding pressure or counter-pressure, without being laterally guided, which is necessary to prevent an inadvertent breaking up or splitting of the rod as a consequence of the expansion of enclosed air or steam which will occur as the pressure is relieved. A limited longitudinal expansion of the briquette rod can be tolerated, the advancing of the rod, however, has to take place against such a strong resistance, that the said lateral guiding is called for until the briquette rod has lost its plasticity. The cooled guiding pipe serves as the lateral guidance. The pipe must not be so wide, on the one hand, that it provides the rod with too much play for lateral deflection and, on the other hand, it has to be wide enough to provide room for a moderate thickening of the rod due to the expansion as the pressure is relieved. In practice, the guiding pipe ought further to be divided axially, so that it can be easily opened for clearing in case a blockage should arise for one reason or another.

Furthermore, it is the function of the cooled guiding pipe to promote the surface cooling of the rod and thereby the formation of a smooth and firm surface crust or shell, which rapidly acquires such a mechanical strength that the briquettes manufactured are able to tolerate mechanical handling, such as conveyor transport or loading into transport trolleys at a time when the briquettes still have a temperature that is somewhat higher than the environmental temperature. This results in the final drying of the briquettes not necessarily having to take place in continuation of the briquette manufacture, but may be carried out during loading into a lorry or truck, or while in same.

In practice, it is possible for the briquette rod to be expediently conducted further forward from the said guiding pipe through an open chute having a length of, e.g. 6–8 m. and a suitable tilt. The resistance originating chiefly from the friction which the briquette rod encounters in this chute, may be adapted to provide the desired holding pressure on the still plastic rod in the guiding pipe, and during the passage or advance through the chute the conditions are good for evaporating the moisture from the briquette rod which is still warm, by which means it is possible to reduce its moisture content by e.g. 2–3%, depending, inter alia, of the original moisture content of the rod.

The pieces of briquette rod can then drop, from the end of the chute, directly down into a transport truck or lorry, for example from a falling height of approximately 1–1.5 m., so that the fragments from the rod are separated into individual briquettes, the thickness or height of which will correspond to the thickness of the portion of material compressed per piston stroke, e.g. 5–7 mm., or to a small multiple of this size. While in the lorry or truck, the moisture content of the briquettes may be reduced still further. This may be done with air by natural or forced flow.

Although the present invention has been adequately described and illustrated in the foregoing specification, it is readily apparent that various changes and modifications can be made without departing from the spirit and scope thereof.

What is claimed is:

1. A method for briquetting grass or similar green crops which comprises:
   a. subsequent to artificial drying to a moisture content of from 15 to 22%, said grass or green crop is subjected to a briquette press having at least one reciprocating punch or piston, which while compressing the material, extrudes the same through an associated die for forming a briquette rod having a diameter ranging from about 50 to about 75 mm., said briquette press maintaining a temperature of from 45° to 65° C.,
   b. exposing said grass or green crop during said briquetting process to a punch or piston pressure of such magnitude that the material is compressed to a specific weight of approximately 0.7 to 0.9 grams per cm.$^3$, thus forming a briquette rod, and
   c. cooling said briquette rod so formed while simultaneously conducting said rod through a guiding pipe, the diameter of which is 10 to 25% greater than the discharge aperture of the die, and the length of which is such that the briquette rod upon discharge from the end of said guiding pipe, has lost the greatest part of its original plasticity, said briquette rod, during passage through the guiding pipe, being kept under pressure in the longitudinal direction in order to counteract its longitudinal expansion.

* * * * *